(12) United States Patent
Niwa et al.

(10) Patent No.: US 9,097,558 B2
(45) Date of Patent: Aug. 4, 2015

(54) POSITION SENSOR

(75) Inventors: Masahisa Niwa, Osaka (JP); Kunitaka Okada, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 247 days.

(21) Appl. No.: 13/637,693

(22) PCT Filed: Feb. 23, 2011

(86) PCT No.: PCT/IB2011/000359
§ 371 (c)(1),
(2), (4) Date: Sep. 27, 2012

(87) PCT Pub. No.: WO2011/154785
PCT Pub. Date: Dec. 15, 2011

(65) Prior Publication Data
US 2013/0021043 A1    Jan. 24, 2013

(30) Foreign Application Priority Data

Jun. 10, 2010  (JP) ................................ 2010-133223

(51) Int. Cl.
*G01R 27/02*     (2006.01)
*G01D 5/20*      (2006.01)

(52) U.S. Cl.
CPC .................................... *G01D 5/2013* (2013.01)

(58) Field of Classification Search
CPC ..... G01R 27/02; G01R 27/2611; G01V 3/101
USPC .......................... 324/655, 633, 652, 668, 654
See application file for complete search history.

(56) References Cited

U.S. PATENT DOCUMENTS 4,783,626 A * 11/1988 Shimizu ................... 324/207.18
4,839,832 A *  6/1989 Galler ............................ 702/65

(Continued)

FOREIGN PATENT DOCUMENTS

JP    S56-8509    1/1981
JP    H5-10994    1/1993

(Continued)

OTHER PUBLICATIONS

International Search Report for corresponding International Application No. PCT/IB2011/000359 mailed Dec. 13, 2011.

(Continued)

*Primary Examiner* — Arleen M Vazquez
*Assistant Examiner* — Dominic Hawkins
(74) *Attorney, Agent, or Firm* — Renner, Otto, Boisselle & Sklar, LLP.

(57) ABSTRACT

A position sensor includes a detector, an oscillation circuit, a signal processing circuit, and a resonance circuit having a detection coil and a capacitor. The oscillation circuit forms a negative feedback loop from: an amplitude detection circuit that detects an amplitude of an oscillation signal outputted from the resonance circuit; an integrating circuit that outputs a signal corresponding to a difference between a predetermined reference voltage and the amplitude of the oscillation signal; a negative conductance control circuit that, based on the output of the integrating circuit, controls the negative conductance of the oscillation circuit such that the amplitude of the oscillation signal is equals to the predetermined reference voltage; and an operational amplifier that adjusts such that the oscillation voltage of the resonance circuit is equal to the applied voltage of the negative conductance control circuit.

9 Claims, 9 Drawing Sheets

(56) References Cited

U.S. PATENT DOCUMENTS

| | | | |
|---|---|---|---|
| 4,987,389 A | | 1/1991 | Brosh et al. |
| 5,049,246 A | * | 9/1991 | Hull et al. ............... 205/80 |
| 5,396,439 A | * | 3/1995 | Yamada ............. 73/514.33 |
| 5,557,076 A | * | 9/1996 | Wieczorek et al. ...... 178/18.03 |
| 5,841,621 A | | 11/1998 | Dean et al. |
| 6,768,956 B2 | * | 7/2004 | Hayashi ................ 702/91 |
| 2005/0062484 A1 | * | 3/2005 | Reining ................ 324/655 |
| 2006/0097732 A1 | * | 5/2006 | Gregg ................. 324/655 |
| 2007/0057657 A1 | * | 3/2007 | Hashimoto et al. ........ 323/282 |
| 2008/0290861 A1 | | 11/2008 | Niwa et al. |
| 2010/0225332 A1 | * | 9/2010 | Niwa et al. ............. 324/652 |
| 2011/0012594 A1 | * | 1/2011 | Kimura et al. ........... 324/309 |
| 2011/0018646 A1 | * | 1/2011 | Lee et al. ............. 331/117 FE |

FOREIGN PATENT DOCUMENTS

| | | |
|---|---|---|
| JP | H7-288995 | 10/1995 |
| JP | 2001-264004 | 9/2001 |
| JP | 2002-267765 | 9/2002 |
| JP | 2008-292376 | 12/2008 |

OTHER PUBLICATIONS

Form PCT/ISA/237 for corresponding International Application No. PCT/IB2011/000359 dated Dec. 13, 2011.

\* cited by examiner

POSITION SENSOR

FIELD OF THE INVENTION

The present invention relates to a position sensor for detecting a displacement of a target object.

BACKGROUND OF THE INVENTION

Conventionally, there have been provided various position sensors each for detecting a displacement of a target object (e.g., a rotation amount, a rotation angle or a rotation position of a rotating target object) as disclosed in, e.g., Patent Document 1. A displacement sensor (position sensor) described in Patent Document 1 includes a detection coil wound around a cylindrical core formed of a non-magnetic material, and a tubular electric conductor arranged near the inside or outside of the detection coil and capable of displacing in an axial direction of the detection coil.

An oscillation circuit outputs an oscillation signal of a frequency corresponding to the inductance of the detection coil varying depending on the distance between the electric conductor and the detection coil and the capacitance of a capacitor connected in parallel with the detection coil, and the displacement of the conductor is detected based on the oscillation signal. Accordingly, the displacement of the target object can be detected by detecting the displacement of the electric conductor moving together with the target object detected based on a change in the inductance of the detection coil.

In this case, the oscillation circuit used in the position sensor as described above is required to faithfully reproduce a resonance frequency of a resonance circuit including the detection coil and the capacitor, and to be inexpensive and suitable for mass production of integrated circuits. A proximity sensor (position sensor) using such oscillation circuit is disclosed in, e.g., Patent Document 2. The proximity sensor described in Patent Document 2 will be briefly described with reference to the drawings.

The proximity sensor includes, as shown in FIG. 6, a resonance circuit 100 including a detection coil L100 and a capacitor C100, and an oscillation circuit 101 which supplies a feedback current If to the resonance circuit 100 to sustain the oscillation of the resonance circuit 100. The oscillation voltage obtained by level-shifting the amplitude of the oscillation voltage outputted from the resonance circuit 100 through an npn type transistor 102 is inputted to the oscillation circuit 101. The level-shifted oscillation voltage is also inputted to a signal processing circuit 103, and the signal processing circuit 103 switches its output depending on the magnitude of the amplitude of the inputted oscillation voltage, thereby detecting an approach of a conductor (not shown), which is a target object to be detected, to the detection coil L100.

The oscillation circuit 101 includes a current mirror circuit having two pnp type transistors 101a and 101b, and the feedback current If is positively fed back to the resonance circuit 100 by the action of the current mirror circuit. Further, the oscillation circuit 101 includes an npn type transistor 101c having a collector connected to a collector of the transistor 101b and an emitter connected to a feedback resistor Rf to configure an emitter follower. A current value of the feedback current If is controlled based on an emitter potential of the transistor 101c, i.e., a voltage applied to the feedback resistor Rf. Further, the oscillation circuit 101 is connected to an amplitude limiter circuit 104 for limiting an amplitude of an oscillation voltage level-shifted in the transistor 102 to a predetermined amplitude.

Further, a negative conductance Gosc of the oscillation circuit 101 is determined by a resistance value of the feedback resistor Rf. For example, if the resistance value of the feedback resistor Rf is R, an absolute value of the negative conductance Gosc of the oscillation circuit 101 is given by |Gosc|=1/(2R). In order to sustain the oscillation of the resonance circuit 100, it is necessary to set the negative conductance Gosc of the oscillation circuit 101 to be always equal to or greater than a conductance Gcoil of the detection coil L100.

Patent Document 1: Japanese Patent Application Publication No. 2008-292376

Patent Document 2: Japanese Patent Application Publication No. 2002-267765

In the above-mentioned conventional example, depending on the relative position between the electric conductor and the detection coil L100, the inductance of the detection coil L100 as well as the conductance Gcoil of the detection coil L100 varies. Thus, it is necessary to accommodatingly set a value of the negative conductance Gosc of the oscillation circuit 101 while taking into account the variation of the conductance Gcoil of the detection coil L100. However, it has been found from experiment that an error in the oscillation frequency of the oscillation circuit 101 with respect to the resonance frequency of the resonance circuit 100 varies depending on the set value of the negative conductance Gosc of the oscillation circuit 101. This problem will be explained based on experimental results.

In this experiment, when the electric conductor was displaced in a range from 0 to 60 mm, the conductance Gcoil of the detection coil L100 was varied in a range from 200 to 900 μS. Further, the oscillation frequencies of the oscillation circuit 101 were measured when a resistance value R of the feedback resistor Rf was set to 430Ω (|Gosc|≈1.2 mS) and when it was set to 240Ω (|Gosc|≈2 mS). The results are shown in FIGS. 7A and 7B.

As shown in FIG. 7A, it has been found that the error in the oscillation frequency of the oscillation circuit 101 with respect to the resonance frequency of the resonance circuit 100 became larger as the absolute value of the negative conductance Gosc of the oscillation circuit 101 became larger. Further, as shown in FIG. 7B, the error in the oscillation frequency of the oscillation circuit 101 with respect to the resonance frequency of the resonance circuit 100 has been found to become larger as the displacement of the electric conductor, i.e., the conductance Gcoil of the detection coil L100, became smaller.

From these results, it has been found that the error in the oscillation frequency of the oscillation circuit 101 with respect to the resonance frequency of the resonance circuit 100 becomes larger as a difference between the absolute value of the negative conductance Gosc of the oscillation circuit 101 and the conductance Gcoil of the detection coil L100 is larger.

In addition, it has been found from the experiment that the error in the oscillation frequency of the oscillation circuit 101 with respect to the resonance frequency of the resonance circuit 100 is also varied by a change in the ambient temperature of the oscillation circuit 101.

Hereinafter, this problem will be explained based on the experimental results. In this experiment, the resistance value R of the feedback resistor Rf was set to 270Ω (|Gosc|≈1.9 mS), and the oscillation frequencies of the oscillation circuit 101 were measured in cases where the ambient temperatures were 25° C. and 125° C.

As shown in FIGS. 8A and 8B, it has been found that the error in the oscillation frequency of the oscillation circuit 101 with respect to the resonance frequency of the resonance circuit 100 became large in the case of the ambient temperature of 125° C. as compared with the case of the ambient temperature of 25° C. More specifically, in the case of the ambient temperature of 25° C., the oscillation frequency of the oscillation circuit 101 with respect to the resonance frequency of the resonance circuit 100 has been found to have an error of 1 to 1.5%. On the other hand, in the case of the ambient temperature of 125° C., the oscillation frequency of the oscillation circuit 101 with respect to the resonance frequency of the resonance circuit 100 has been found to have an error of 2 to 3.5%. That is, it has been found that the error in the oscillation frequency of the oscillation circuit 101 with respect to the resonance frequency of the resonance circuit 100 becomes large as the ambient temperature increases.

As described above, in the conventional example, there has been a problem in that the error in the oscillation frequency of the oscillation circuit 101 with respect to the resonance frequency of the resonance circuit 100 is increased or varied by the setting of the negative conductance Gosc of the oscillation circuit 101 and the ambient temperature of the oscillation circuit 101.

SUMMARY OF THE INVENTION

In view of the above, the present invention provides a position sensor capable of reducing an error and variation in an oscillation frequency of an oscillation circuit with respect to a resonance frequency of a resonance circuit.

In accordance with an embodiment of the present invention, there is provided a position sensor including: a resonance circuit which includes a detection coil and a capacitor connected in parallel with the detection coil; a detector which is arranged near the detection coil and is displaced along a specified orbit with respect to the detection coil in response to a displacement of a target object; an oscillation circuit configured to supply a feedback current to the resonance circuit to sustain an oscillation of the resonance circuit, and output an oscillation signal of a frequency corresponding to an inductance of the detection coil varying depending on the displacement of the detector; and a signal processing circuit configured to detect the displacement of the target object based on the oscillation signal outputted from the oscillation circuit.

Further, the oscillation circuit includes an amplitude detection circuit configured to detect an amplitude of an oscillation signal outputted from the resonance circuit, and a negative conductance control circuit configured to control a negative conductance of the oscillation circuit, the oscillation circuit forming a negative feedback loop to control the negative conductance control circuit such that the amplitude of the oscillation signal outputted from the resonance circuit is constant.

Further, the oscillation circuit may be configured to operate linearly over a full cycle of the oscillation signal outputted from the oscillation circuit.

Further, the oscillation circuit may be provided with a low-pass filter, which blocks at least a signal of a frequency higher than the frequency of the oscillation signal, at a location in the negative feedback loop.

Further, the signal processing circuit may include a squaring circuit configured to calculate and output a square value of a cycle of the oscillation signal outputted from the oscillation circuit, and detect the displacement of the target object based on an output signal of the squaring circuit.

In accordance with the embodiment of the present invention, by controlling the amplitude of the oscillation signal from the resonance circuit to be constant, the negative conductance of the oscillation circuit can be controlled to become closely approximated to the conductance of the detection coil varying depending on the displacement of the target object. Therefore, it is possible to continuously control the feedback current to the resonance circuit and to maintain the amplitude of the oscillation signal to be constant while the oscillation circuit performs a linear operation as a whole, thereby reducing the variation and the error in the oscillation frequency of the oscillation circuit with respect to the resonance frequency of the resonance circuit.

BRIEF DESCRIPTION OF THE DRAWINGS

The objects and features of the present invention will become apparent from the following description of embodiments, given in conjunction with the accompanying drawings, in which:

FIGS. 7A and 7B are graphs for explaining a problem in the conventional sensor, wherein FIG. 7A shows a correlation between the oscillation frequency and the resonance frequency while the conductance of the oscillation circuit is varied, and FIG. 7B shows a correlation between the displacement of an electric conductor and a relative value of the oscillation frequency with respect to the resonance frequency; and FIGS. 8A and 8B are graphs for explaining another problem in the conventional sensor, wherein FIG. 8A shows a correlation between the oscillation frequency and the resonance frequency in the case of the ambient temperature set to 25° C., and FIG. 8B shows a correlation between the oscillation frequency and the resonance frequency in the case of the ambient temperature set to 125° C.

DETAILED DESCRIPTION OF THE EMBODIMENTS

Figure 1:
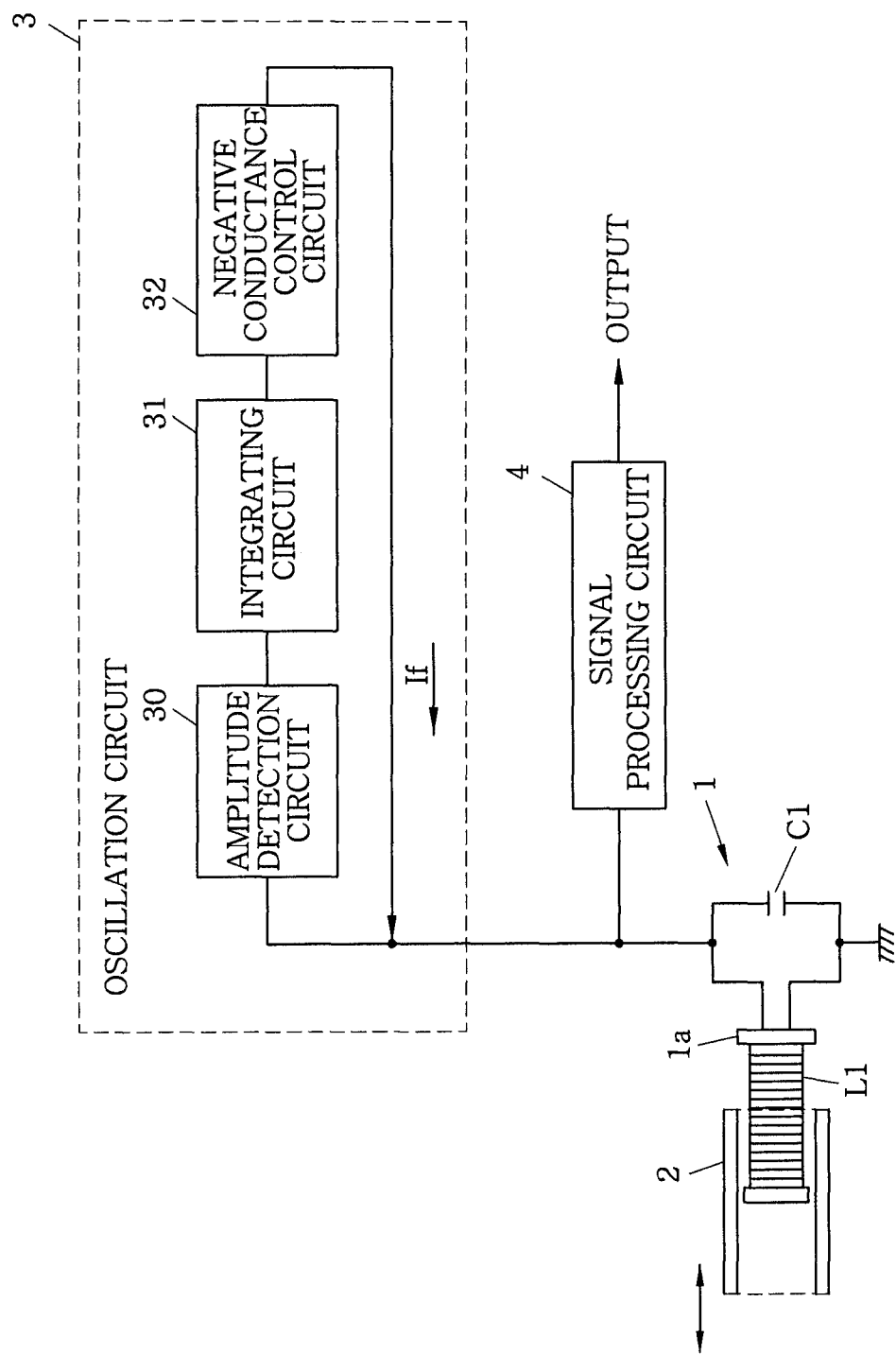
FIG. 1 is a schematic view showing a position sensor in accordance with an embodiment of the present invention.

Hereinafter, embodiments of the present invention will be described in detail with reference to the accompanying drawings which form a part hereof. Throughout the specification and drawings, like reference numerals will be given to like parts having substantially the same function and configuration, and a redundant description thereof will be omitted.

A position sensor in accordance with an embodiment of the present invention includes, as shown in FIG. 1, a resonance circuit 1, a detector 2, an oscillation circuit 3, and a signal processing circuit 4. The oscillation circuit 3 includes an amplitude detection circuit 30, an integrating circuit 31, a negative conductance control circuit 32, and an operational amplifier (differential amplifier) OP1. Further, the oscillation circuit 3 and the signal processing circuit 4 are integrated in an integrated circuit such as a monolithic integrated circuit. Further, the amplitude detection circuit 30, the integrating circuit 31, the negative conductance control circuit 32 and the operational amplifier OP1 form a negative feedback loop.

The resonance circuit 1 includes, as shown in FIG. 1, a parallel circuit of a capacitor C1 and a detection coil L1 wound around a cylindrical core 1a formed of a non-magnetic material. The oscillation frequency of an oscillation signal of the resonance circuit 1 is determined by the capacitance of the capacitor C1 and the inductance of the detection coil L1. The detector 2 is formed of a tubular electric conductor arranged near the inside or outside of the detection coil L1 and is capable of displacing in an axial direction of the detection coil L1. Further, the detector 2 is not limited thereto as long as it is arranged in the vicinity of the detection coil L1 and displaced on a predetermined orbit with respect to the detection coil L1 in conjunction with the displacement of a target object (not shown).

Figure 2:
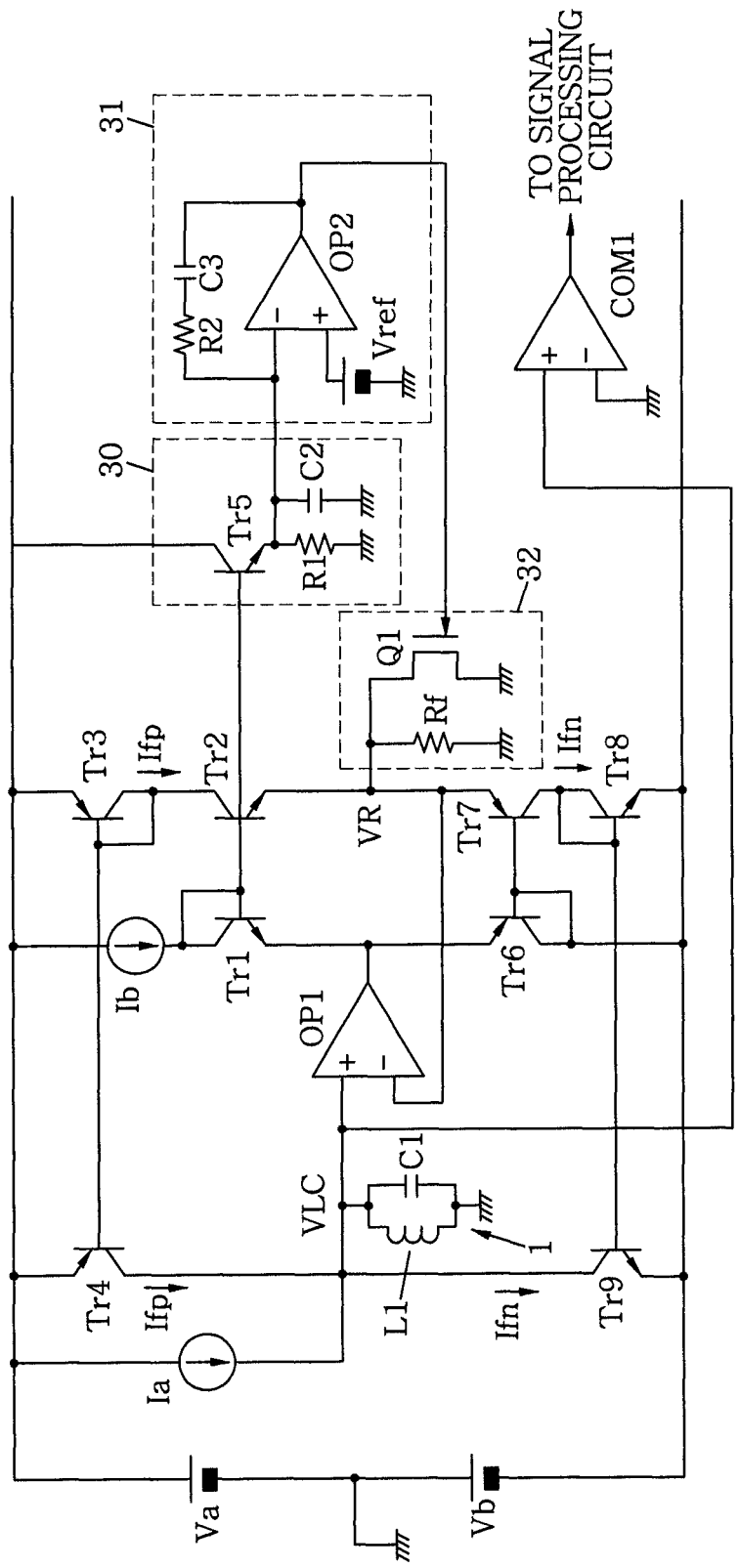
FIG. 2 is a circuit diagram of an oscillation circuit of the position sensor in accordance with the embodiment of the present invention.

The oscillation circuit 3 includes, as shown in FIG. 2, a first constant current source Ia which supplies a constant bias current to the resonance circuit 1 from a positive power supply Va that is an internal power supply to supply a positive voltage, and a second constant current source Ib which supplies a constant bias current to a collector of a transistor Tr1 that will be described later. An oscillation voltage VLC of the resonance circuit 1 (voltage across the capacitor C1) is inputted to the non-inverting input terminal of the operational amplifier OP1. The operational amplifier OP1 adjusts an output voltage such that an applied voltage VR of the negative conductance control circuit 32, which is inputted to an inverting input terminal, is equal to the oscillation voltage VLC of the resonance circuit 1. The output terminal of the operational amplifier OP1 is connected to an emitter of the npn type transistor Tr1. The transistor Tr1 is configured to level-shift the oscillation voltage of the resonance circuit 1 by an amount equal to a base-emitter voltage. Further, a base of the transistor Tr1 is connected to the collector of the transistor Tr1.

The base of the transistor Tr1 is connected to a base of an npn type transistor Tr2. The transistor Tr2 is configured to output a current (amplified current) corresponding to the oscillation voltage of the resonance circuit 1, and the oscillation voltage level-shifted by the transistor Tr1 is inputted to the base of the transistor Tr2. Further, since the voltage level-shifted by an amount equal to the base-emitter voltage of the transistor Tr1 is inputted to the transistor Tr2, the voltage equal to the oscillation voltage of the resonance circuit 1 is applied between the ground and an emitter of the transistor Tr2 only for the positive cycle of the oscillation signal. Further, the emitter of the transistor Tr2 is connected to the ground through the negative conductance control circuit 32 to serve as an emitter follower.

Connected to a collector of the transistor Tr2 is a collector of a pnp type transistor Tr3. Similarly, connected to a base of the transistor Tr3 is a base of a pnp type transistor Tr4. An emitter of each of the transistors Tr3 and Tr4 is connected to the positive power supply Va, and a collector of the transistor Tr4 is connected to the output terminal of the resonance circuit 1. A current mirror circuit is configured by the two transistors Tr3 and Tr4. Accordingly, by the action of the current mirror circuit, a feedback current If (Ifp) corresponding to the magnitude of the current outputted from the transistor Tr2 is supplied to the resonance circuit 1. That is, the feedback current If is positively fed back to the resonance circuit 1 in order to maintain the oscillation of the resonance circuit 1.

The amplitude detection circuit 30 is configured to detect the amplitude of the oscillation voltage of the resonance circuit 1, and includes an npn type transistor Tr5, a resistor R1, and a capacitor C2. The transistor Tr5 has a collector connected to the positive power supply Va, a base connected to the base and the collector of the transistor Tr1, and an emitter connected to a parallel circuit of the resistor R1 and the capacitor C2. Further, a current corresponding to a voltage inputted to the base of the transistor Tr5 (the oscillation voltage of the resonance circuit 1 level-shifted by the transistor Tr1) flows between the collector and the emitter of the transistor Tr5, and the capacitor C2 is charged by this current. Accordingly, the amplitude of the oscillation voltage of the resonance circuit 1 is detected by detecting a voltage across the capacitor C2, and a signal corresponding to the detected amplitude is outputted to the integrating circuit 31 in a subsequent stage.

The integrating circuit 31 is configured to integrate an output voltage from the amplitude detection circuit 30, and includes an operational amplifier OP2, a reference voltage source Vref, a resistor R2, and a capacitor C3. The output terminal of the amplitude detection circuit 30 is connected to an inverting input terminal of the operational amplifier OP2, and the reference voltage source Vref which outputs a predetermined reference voltage is connected to a non-inverting input terminal of the operational amplifier OP2. Further, a series circuit of the resistor R2 and the capacitor C3 is connected between an output terminal and an inverting input terminal of the operational amplifier OP2. Accordingly, a signal corresponding to a difference between the input voltage and the predetermined reference voltage is outputted from the operational amplifier OP2 to the negative conductance control circuit 32 in a subsequent stage.

The negative conductance control circuit 32 controls a negative conductance Gosc by controlling the magnitude of a current outputted from the transistor Tr2, i.e., controlling the feedback current If. The negative conductance control circuit 32 includes a feedback resistor Rf, and a switching element Q1 having an n-channel type field-effect transistor (FET). The feedback resistor Rf is connected between the ground and the emitter of the transistor Tr2, and the switching element Q1 is also connected between the ground and the emitter of the transistor Tr2.

The voltage outputted from the integrating circuit 31 is inputted to the gate terminal of the switching element Q1, so that ON/OFF control of the switching element Q1 is performed. Further, an on-resistance Ron changes depending on the voltage inputted to the gate terminal. As the on-resistance Ron changes, a combined resistance R' of the feedback resistor Rf and the on-resistance Ron is changed and the feedback current If is controlled.

Here, an absolute value of the negative conductance Gosc of the oscillation circuit 3 is defined as a ratio of the feedback current If to the oscillation voltage VLC of the resonance circuit 1 ($|Gosc|=If/VLC$). Further, the feedback current If is equal to the current flowing into the negative conductance control circuit 32 and, thus, if the applied voltage of the negative conductance control circuit 32 is VR, the feedback current If is given by $If=VR/R'$. The applied voltage VR of the negative conductance control circuit 32 is adjusted to be equal to the oscillation voltage VLC of the resonance circuit 1 by the operational amplifier OP1. Accordingly, since VLC=VR, the absolute value of the negative conductance Gosc of the oscillation circuit 3 is given by $|Gosc|=1/R'$ from the two equations. Thus, the negative conductance Gosc of the oscillation circuit 3 varies depending on the combined resistance R' of the negative conductance control circuit 32. In this case, since the combined resistance R' changes depending on the voltage inputted to the gate terminal of the switching element Q1, the negative conductance Gosc may be varied depending on the voltage inputted to the gate terminal of the switching element Q1.

The signal processing circuit 4 includes, e.g., a microcomputer to detect the displacement of a target object moving together with the detector 2 based on the oscillation signal from the oscillation circuit 3. The signal processing circuit 4 is conventionally known as described in Patent Document 1 and, thus, a detailed description thereof will be omitted.

Further, as shown in FIG. 2, the oscillation signal outputted from the oscillation circuit 3 is converted into a square wave signal by a comparator COM1, and then inputted to the signal processing circuit 4. For this reason, the signal processing circuit 4 of this embodiment detects the displacement of the target object moving together with the detector 2 based on the frequency or cycle of the input square wave signal.

Figure 6:
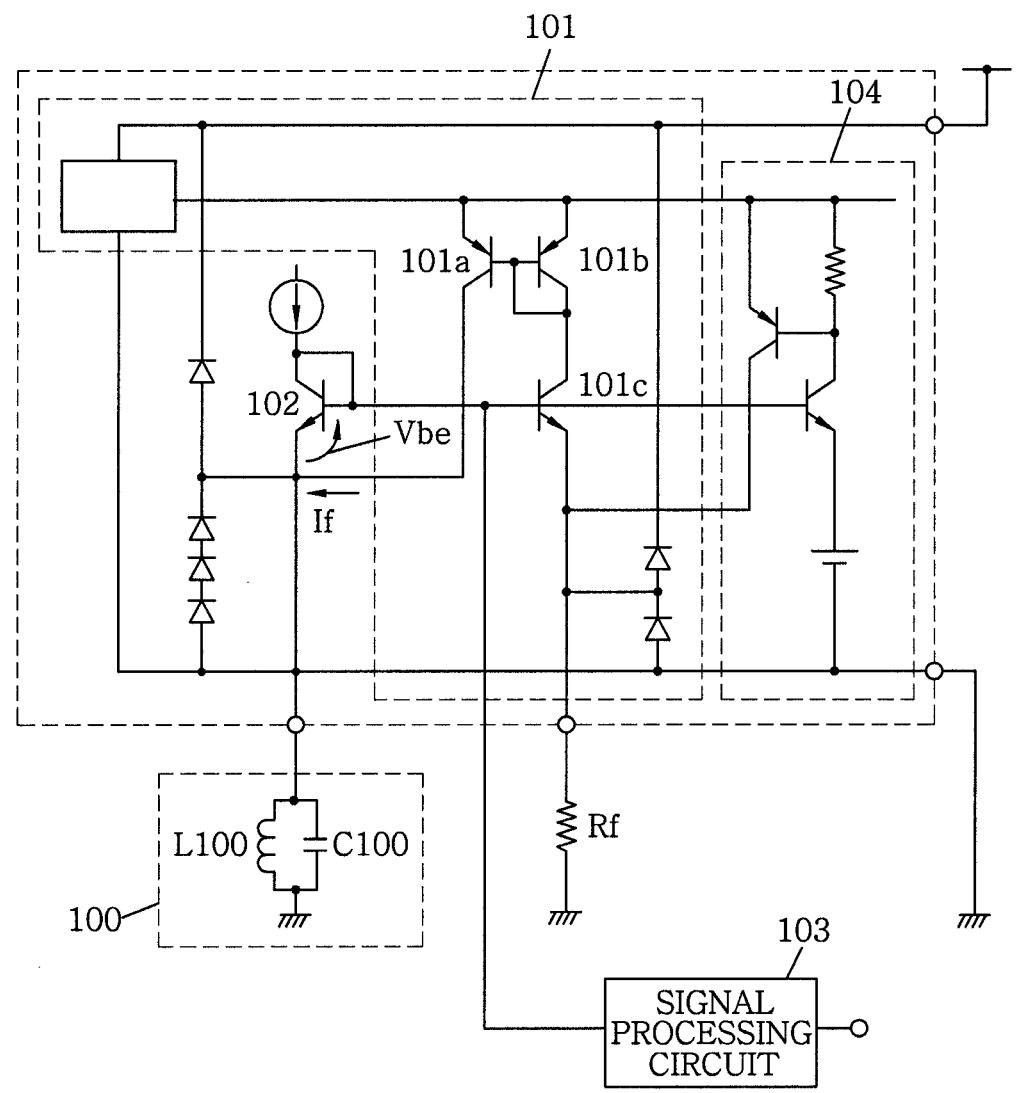
FIG. 6 is a circuit diagram of an oscillation circuit used in a conventional proximity sensor.
Figure 7A:
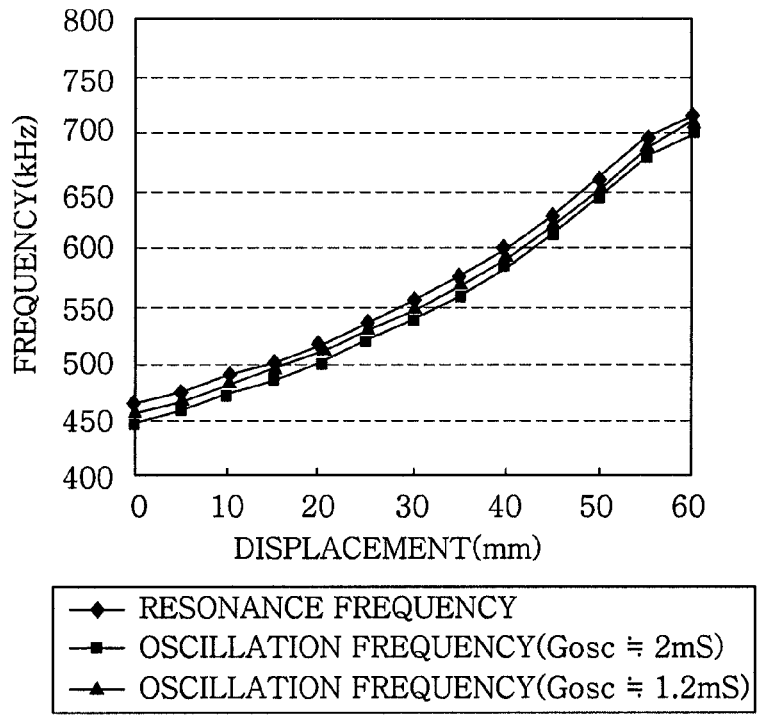
Figure 7B:
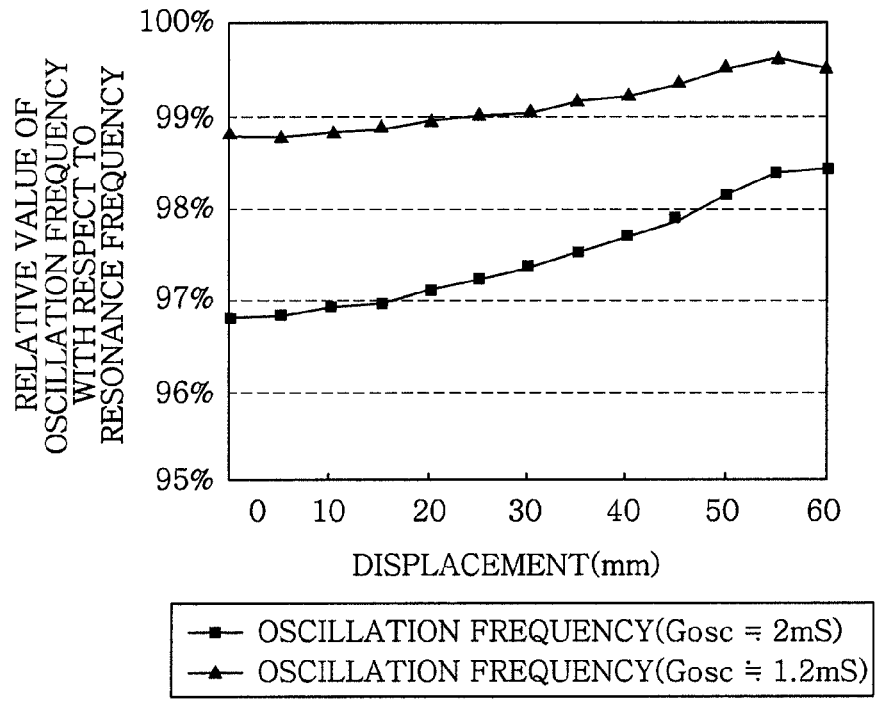
Figure 8A:
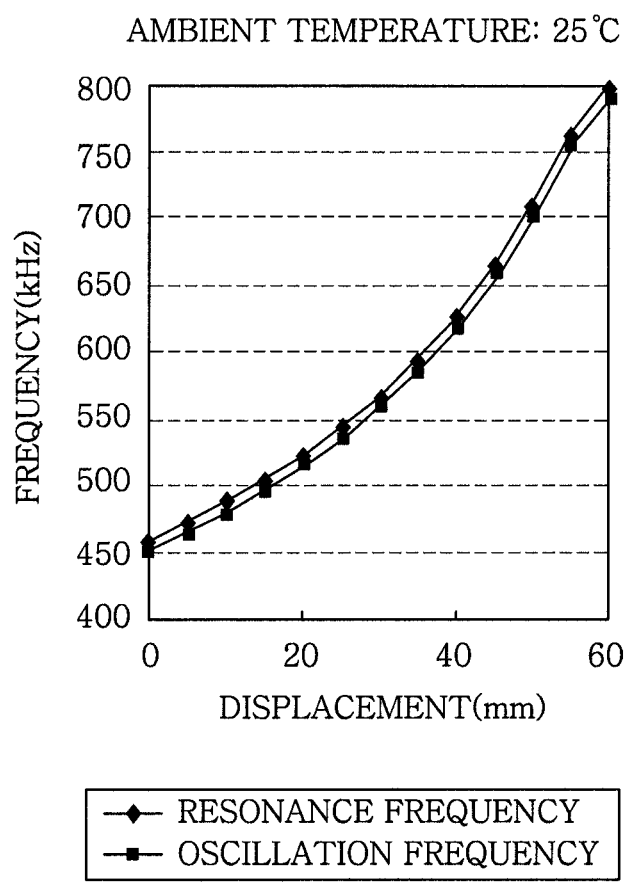
Figure 8B:
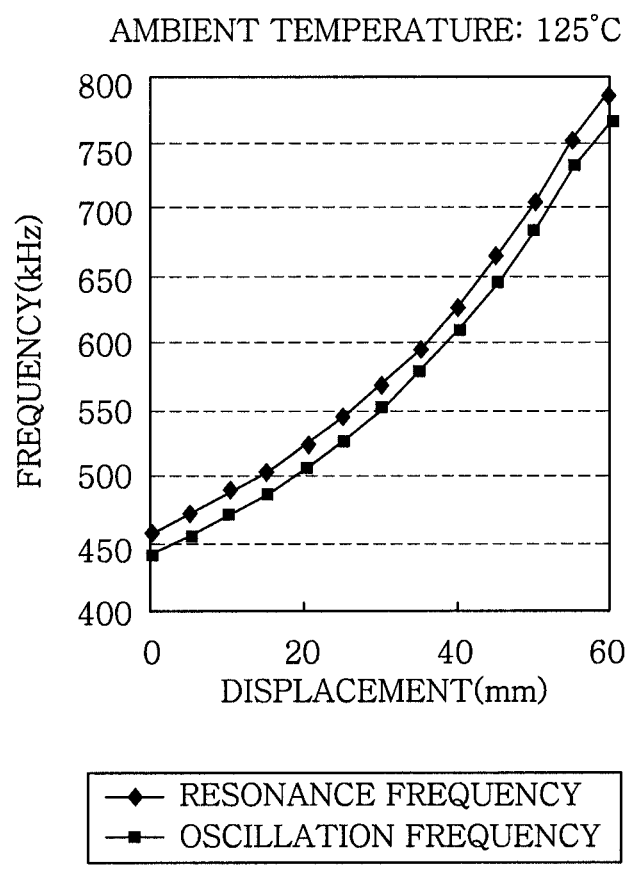

In the conventional example (see FIG. 6), for example, if the amplitude of the oscillation signal from the resonance circuit 100 is greater than the predetermined value, the amplitude limiter circuit 104 operates to flow the current through the feedback resistor Rf, thereby controlling the feedback current If. However, at this time, the applied voltage to the feedback resistor Rf increases so that a reverse bias is applied to the transistor 101c, and the feedback current If is cut off temporarily. Accordingly, the oscillation circuit 101 operates nonlinearly as a whole. This nonlinear operation is considered to cause an error in the oscillation frequency of the oscillation circuit 101 with respect to the resonance frequency of the resonance circuit 100. Further, it is considered that this error increases as the negative conductance Gosc of the oscillation circuit 101 increases, and as a difference between the negative conductance Gosc and the conductance Gcoil of the detection coil L100 increases.

On the other hand, in this embodiment, for example, if the amplitude of the oscillation signal from the resonance circuit 1 becomes greater than a predetermined value, the gate voltage of the switching element Q1 of the negative conductance control circuit 32 is controlled such that the amplitude of the oscillation signal becomes equal to the predetermined value. By doing so, the on-resistance Ron of the switching element Q1 is changed, so that the combined resistance R' is changed. Consequently, the negative conductance Gosc of the oscillation circuit 3 is changed.

Here, in case where the amplitude of the oscillation signal from the resonance circuit 1 becomes greater than the predetermined value, which means that the conductance Gcoil of the detection coil L1 fluctuates and becomes smaller than the absolute value of the negative conductance Gosc of the oscillation circuit 3, the amplitude of the oscillation signal is controlled to be equal to the predetermined value, so that the absolute value of the negative conductance Gosc of the oscillation circuit 3 is controlled to be closely approximated to the conductance Gcoil of the detection coil L1.

Further, even in case where the amplitude of the oscillation signal from the resonance circuit 1 becomes smaller than the predetermined value, which means that the conductance Gcoil of the detection coil L1 becomes larger than the absolute value of the negative conductance Gosc of the oscillation circuit 3, the amplitude of the oscillation signal is controlled to be equal to the predetermined value, so that the absolute value of the negative conductance Gosc of the oscillation circuit 3 is controlled to be closely approximated to the conductance Gcoil of the detection coil L1.

By controlling the negative conductance Gosc of the oscillation circuit 3 in this way, no reverse bias is applied to the transistor Tr2 corresponding to the transistor 101c of the conventional example and, thus, it is possible to continuously control the feedback current If.

Accordingly, in this embodiment, by controlling the amplitude of the oscillation signal from the resonance circuit 1 to be constant, the negative conductance Gosc of the oscillation circuit 3 can be controlled to be closely approximated to the conductance Gcoil of the detection coil L1 that varies depending on the displacement of the target object. Therefore, it is possible to continuously control the feedback current If and to maintain the amplitude of the oscillation signal to be constant while the oscillation circuit 3 performs a linear operation as a whole, thereby reducing the variation and the error in the oscillation frequency of the oscillation circuit 3 with respect to the resonance frequency of the resonance circuit 1.

In the conventional example, since the transistor 101c of the oscillation circuit 101 operates only in the positive cycle of the oscillation signal, the transistor 101c does not operate in the negative cycle of the oscillation signal and this has been one factor causing the nonlinear operation.

However, in this embodiment, as shown in FIG. 2, in addition to the positive power supply Va as an internal power supply of the oscillation circuit 3, a negative power supply Vb for supplying a negative voltage is connected in series with the positive power supply Va. Further, there are provided pnp type transistors Tr6 and Tr7 respectively corresponding to the transistors Tr1 and Tr2, and npn type transistors Tr8 and Tr9 respectively corresponding to the transistors Tr3 and Tr4. That is, the oscillation circuit 3 includes a push-pull amplifier circuit having the transistors Tr1 to Tr4 which operate only in the positive voltage cycle of the oscillation signal of the resonance circuit 1, and the transistors Tr6 to Tr9 which operate only in the negative voltage cycle of the oscillation signal of the resonance circuit 1. Further, the transistor Tr6 is configured to level-shift the oscillation voltage of the resonance circuit 1 similarly to the transistor Tr1, and the transistor Tr7 is configured to output the current (amplified current) corresponding to the oscillation voltage of the resonance circuit 1 similarly to the transistor Tr2. Further, the transistors Tr8 and Tr9 are configured, similarly to the transistors Tr3 and Tr4, to supply a feedback current If (Ifn) corresponding to the magnitude of the current outputted from the transistor Tr7 to the resonance circuit 1 by the action of the current mirror circuit.

Accordingly, in this embodiment, the transistors Tr1 to Tr4 operate in the positive voltage cycle of the oscillation signal, and the transistors Tr6 to Tr9 operate in the negative voltage cycle of the oscillation signal, so that the feedback current If can be positively fed back to the resonance circuit 1. Thus, the feedback current If that is proportional to the amplitude of the oscillation voltage over a whole cycle (i.e., the entire period) of the oscillation signal can be fed back to the resonance circuit 1 to perform a linear operation.

Therefore, it is possible to further reduce the variation and the error in the oscillation frequency of the oscillation circuit 3 with respect to the resonance frequency of the resonance circuit 1 in comparison with the conventional example. Specifically, when the detector 2 is displaced in the range from 0 to 60 mm, the error can be made equal to or less than 0.1% over the entire region of displacement. Further, even when the ambient temperature of the oscillation circuit 3 is either 25° C. or 125° C., the error can be made equal to or less than 0.1%.

Further, as described above, the oscillation circuit 3 in this embodiment is configured as the push-pull amplifier circuit to operate linearly over the entire period of the oscillation signal, but it is not limited to the above configuration. That is, the oscillation circuit 3 may be configured by using a configuration other than the above push-pull amplifier circuit as long as it is configured to operate linearly over the entire period of the oscillation signal.

Figure 3:
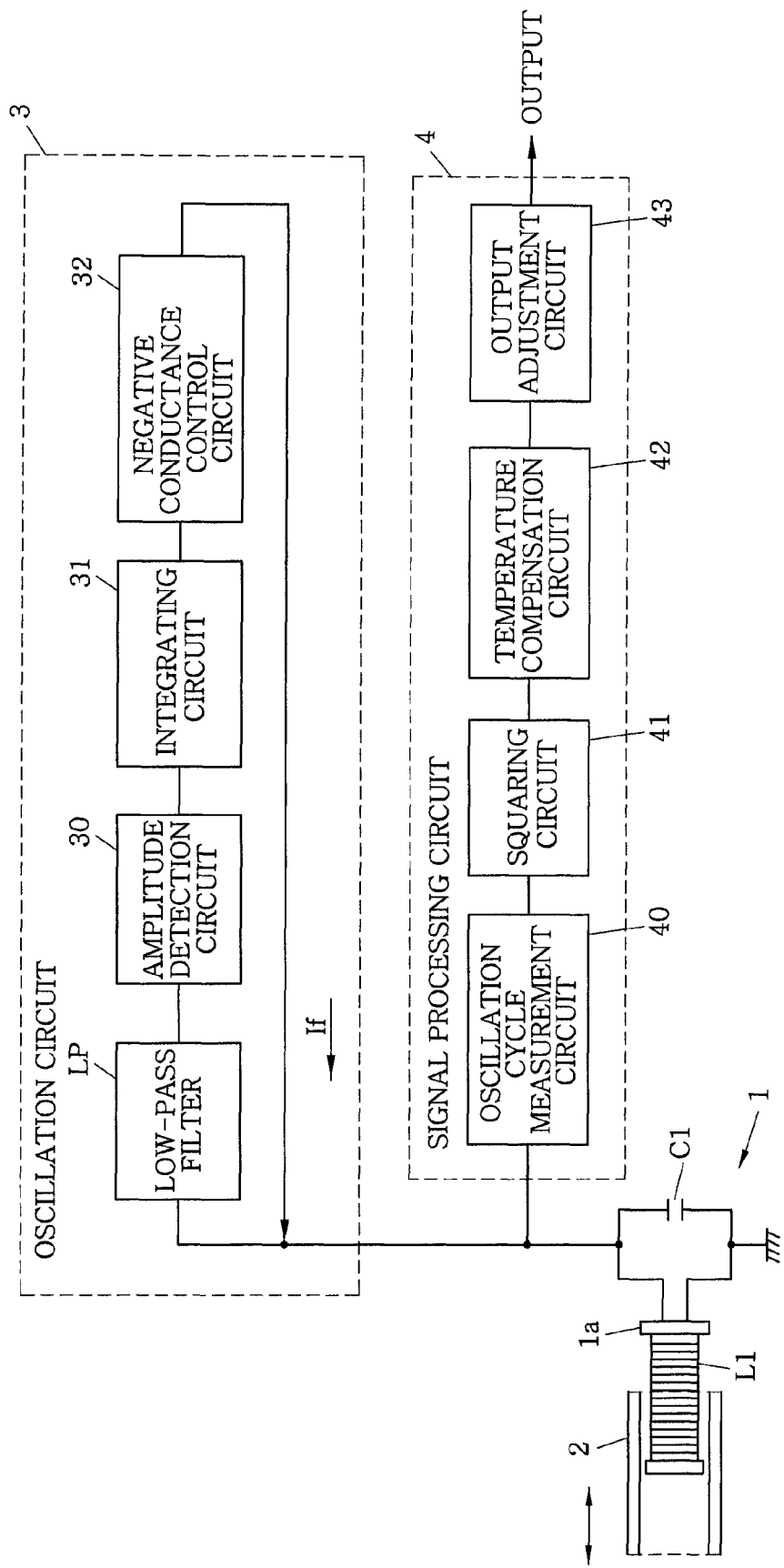
FIG. 3 is a schematic view showing another configuration of the position sensor in accordance with the embodiment of the present invention.

Further, as shown in FIG. 3, there may be provided a low-pass filter LP to block at least a signal of a frequency higher than the frequency of the oscillation signal in a front stage of the amplitude detection circuit 30 in the oscillation circuit 3. By this configuration, it is possible to prevent a change in the oscillation frequency of the oscillation circuit 3 by radiation noise from the outside. Further, the location of the low-pass filter LP is not limited to the front stage of the amplitude detection circuit 30, and the low-pass filter LP may be provided at any location in a negative feedback loop including the amplitude detection circuit 30, the integrating circuit 31, the negative conductance control circuit 32 and the operational amplifier OP1.

Further, as shown in FIG. 3, the signal processing circuit 4 may be configured to include an oscillation cycle measurement circuit 40, a squaring circuit 41, a temperature compensation circuit 42, and an output adjustment circuit 43. The oscillation cycle measurement circuit 40 is configured to measure the oscillation cycle of the oscillation signal outputted from the oscillation circuit 3 to output a signal corresponding to the measured oscillation cycle. The squaring circuit 41 is configured to calculate and output a square value of the output signal from the oscillation cycle measurement circuit 40. The temperature compensation circuit 42 is configured to compensate for a temperature variation in the output signal from the squaring circuit 41. The output adjustment circuit 43 is configured to adjust the output by performing at least one of an offset process for adding a predetermined addition value to a signal value outputted from the temperature compensation circuit 42 and a gain process for multiplying a predetermined multiplication value to the signal value outputted from the temperature compensation circuit 42. The configuration and operation of each circuit of the oscillation cycle measurement circuit 40, the squaring circuit 41 and the temperature compensation circuit 42 are conventionally known as described in Patent Document 1 and, thus, a detailed description thereof will be omitted.

Here, the oscillation cycle of the oscillation signal from the oscillation circuit 3 includes a square root of the inductance and the capacitance. However, since the squaring circuit 41 calculates and outputs the square value of the oscillation cycle of the oscillation signal, the square root of the inductance and the capacitance can be removed. Accordingly, the output signal from the squaring circuit 41 becomes a signal varying linearly with respect to the displacement of the target object and, thus, it is possible to easily perform signal processing of the output signal.

In the above description, the detector 2 and the detection coil L1 have the same configurations as those of the conventional example described in Patent Document 1, and the position sensor is a linear-motion-type position sensor in which the detector 2 is displaced along the linear orbit. However, the configurations of the detection coil L1 and the detector 2 are not limited to the above-described configurations, and the detection coil L1 and the detector 2 may have other configurations using the variation of the oscillation frequency. Further, in order to simplify the illustration, the comparator COM1 between the resonance circuit 1 and the signal processing circuit 4 is not shown in FIGS. 1 and 3.

Hereinafter, another configuration will be described with reference to the drawings.

Figure 4:
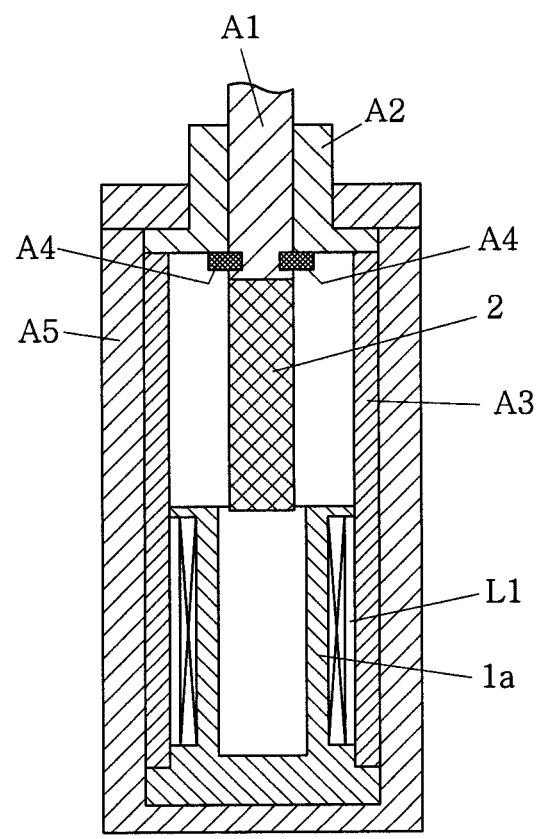
FIG. 4 is a schematic view showing a linear-motion-type of the position sensor in accordance with the embodiment of the present invention.

First, a description will be given for an embodiment of another linear-motion-type position sensor. This embodiment includes, as shown in FIG. 4, a detection coil L1 wound around a cylindrical bobbin 1a, a rod-shaped detector 2 which can be freely displaced inside the bobbin 1a in an axial direction thereof, and a rod-shaped guide portion A1 connecting the detector 2 with a target object.

In addition, this embodiment includes a holding portion A2 which holds the guide portion A1 to be movable in the axial direction such that the detector 2 can move in the axial direction without contacting the inner surface of the detection coil L1, and a shield member A3 for magnetic shielding which covers the outer peripheral surface of the detection coil L1.

Further, this embodiment includes a stopper portion A4 which restricts the movement of the detector 2 to prevent the detector 2 from being in contact with the holding portion A2 while restricting the movement of the guide portion A1 to prevent the guide portion A1 from entering into the detection coil L1. Further, the detection coil L1, the detector 2, the guide portion A1, the holding portion A2, the shield member A3, and the stopper portion A4 are received in a case A5. In this embodiment as well, by detecting the displacement of the detector 2 moving together with the target object based on a change in the inductance of the detection coil L1, it is possible to detect the displacement of the target object.

Figure 5:
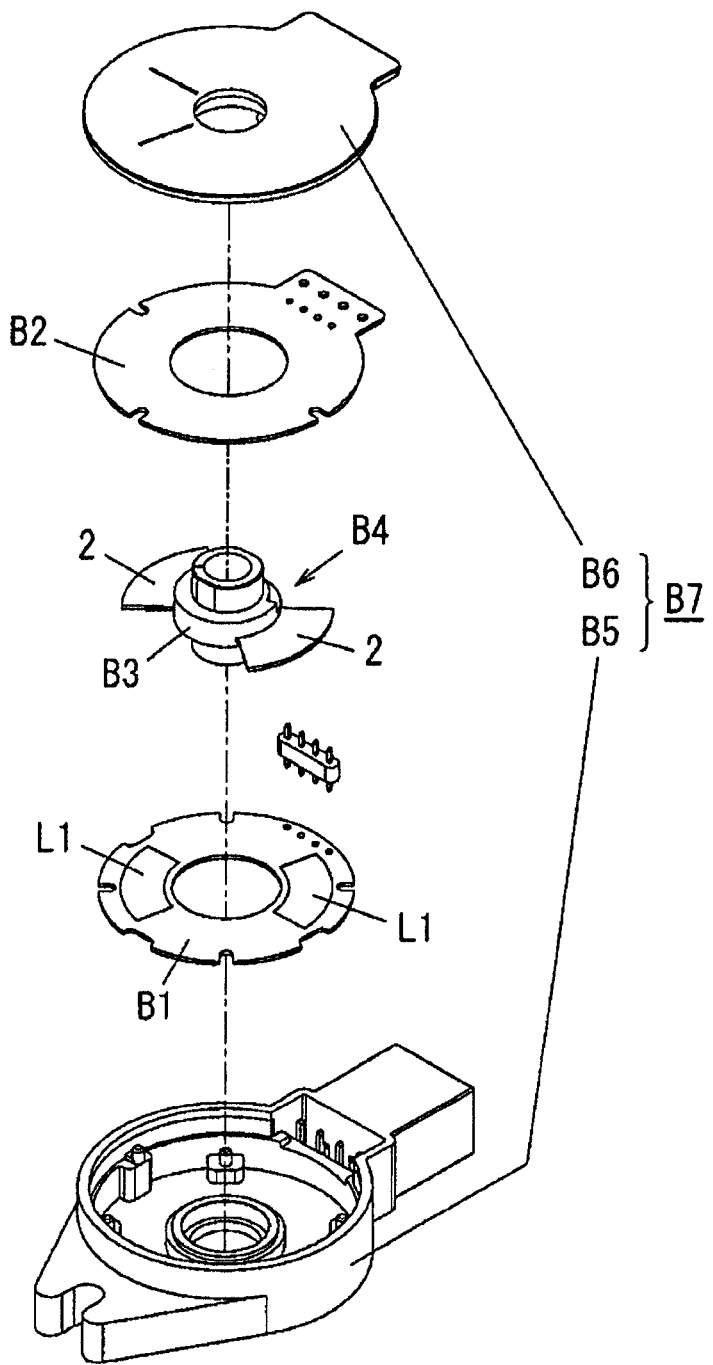
FIG. 5 is a schematic view showing a rotary type of the position sensor in accordance with the embodiment of the present invention.

Next, a description will be given for an embodiment of a rotary type position sensor. This embodiment includes, as shown in FIG. 5, a first insulating substrate B1 having a pair of detection coils L1 printed on one surface thereof, and a second insulating substrate B2 having a pair of detection coils (not shown) printed on one surface thereof. Further, this embodiment includes a rotor block B4 having a pair of detectors 2 formed into a fan-like shape by a non-magnetic material and a holder B3 for holding the detectors 2. The first and the second insulating substrate B1 and B2 and the rotor block B4 are accommodated in a case B7 which includes a box-shaped body B5 with one open surface and a cover B6 closing the open surface of the body B5.

The operation of the position sensor will be briefly described below. When the holder B3 of the rotor block B4 moving together with the target object is rotated along with the displacement of the target object, the detectors 2 are deviated from each other at 180 degrees and moved along a circumferential orbit in response to the rotation of the holder B3. Then, the oscillation circuit 3 (see FIG. 3) outputs an oscillation signal of a frequency corresponding to the inductance of the detection coils varying depending on the relative position between the detectors 2 and two pairs of detection coils. By detecting the displacement of the detectors 2 based on the oscillation signal, it is possible to detect information on the relative position between the detectors 2 and the detection coils, i.e., the rotation amount of the target object moving together with the rotor block B4.

While the invention has been shown and described with respect to the embodiments, it will be understood by those skilled in the art that various changes and modification may be made without departing from the scope of the invention as defined in the following claims.

What is claimed is:

1. A position sensor comprising:
   a resonance circuit which includes a detection coil and a capacitor connected in parallel with the detection coil;

a detector which is arranged near the detection coil and is displaced along a specified orbit with respect to the detection coil in response to a displacement of a target object;

an oscillation circuit configured to supply a feedback current to the resonance circuit to sustain an oscillation of the resonance circuit, and output an oscillation signal of a frequency corresponding to an inductance of the detection coil varying depending on the displacement of the detector; and a signal processing circuit configured to detect the displacement of the target object based on the oscillation signal outputted from the oscillation circuit, wherein the oscillation circuit includes an amplitude detection circuit configured to detect an amplitude of an oscillation signal outputted from the resonance circuit, and a negative conductance control circuit configured to control a negative conductance of the oscillation circuit, the oscillation circuit forming a negative feedback loop to control the negative conductance control circuit such that the amplitude of the oscillation signal outputted from the resonance circuit is constant.

2. The position sensor of claim 1, wherein the oscillation circuit is configured to operate linearly over a full cycle of the oscillation signal outputted from the oscillation circuit.

3. The position sensor of claim 1, wherein the oscillation circuit is provided with a low-pass filter, which blocks at least a signal of a frequency higher than the frequency of the oscillation signal, at a location in the negative feedback loop.

4. The position sensor of claim 1, wherein the signal processing circuit includes a squaring circuit configured to calculate and output a square value of a cycle of the oscillation signal outputted from the oscillation circuit, and detects the displacement of the target object based on an output signal of the squaring circuit.

5. The position sensor of claim 2, wherein the oscillation circuit is provided with a low-pass filter, which blocks at least a signal of a frequency higher than the frequency of the oscillation signal, at a location in the negative feedback loop.

6. The position sensor of claim 2, wherein the signal processing circuit includes a squaring circuit configured to calculate and output a square value of a cycle of the oscillation signal outputted from the oscillation circuit, and detects the displacement of the target object based on an output signal of the squaring circuit.

7. The position sensor of claim 3, wherein the signal processing circuit includes a squaring circuit configured to calculate and output a square value of a cycle of the oscillation signal outputted from the oscillation circuit, and detects the displacement of the target object based on an output signal of the squaring circuit.

8. The position sensor of claim 1, further comprising an integrating circuit configured to integrate an output voltage from the amplitude detection circuit and output the integrated output voltage to the negative conductance control circuit.

9. The position sensor of claim 8, wherein the negative conductance control circuit includes a switching element, and
  wherein an on-and-off control of the switching element is performed according to the integrated output voltage whereby the negative conductance of the oscillation circuit is controlled.

* * * * *